United States Patent [19]

Moretti

[11] Patent Number: 5,520,420
[45] Date of Patent: May 28, 1996

[54] PROTECTIVE CAP FOR A RELEASABLE QUICK-ACTION CLOSURE COUPLING

[75] Inventor: Erminio Moretti, Grenoble, France

[73] Assignee: A. Raymond & Cie, Grenoble, France

[21] Appl. No.: 358,467

[22] Filed: Dec. 19, 1994

[30] Foreign Application Priority Data

Dec. 27, 1993 [DE] Germany ............... 43 44 665.5

[51] Int. Cl.$^6$ ............... F16L 35/00; F16L 37/08
[52] U.S. Cl. ............... 285/81; 285/305; 285/308
[58] Field of Search ............... 285/81, 84, 86, 285/305, 308, 317, 319, 39

[56] References Cited

U.S. PATENT DOCUMENTS

| | | | |
|---|---|---|---|
| 2,132,506 | 10/1938 | Allen | 285/81 |
| 2,159,150 | 5/1939 | Heintz | 285/81 |
| 4,358,140 | 11/1982 | Jonsson | 285/81 |
| 4,527,816 | 7/1985 | Bresie et al. | 285/81 |
| 4,632,436 | 12/1986 | Kimura | 285/305 |
| 4,991,882 | 2/1991 | Gähwiler | 285/423 |
| 5,213,376 | 5/1993 | Szabo | 285/39 |
| 5,356,183 | 10/1994 | Cole | 285/308 |
| 5,374,088 | 12/1994 | Moretti et al. | 285/305 |

FOREIGN PATENT DOCUMENTS

| | | | |
|---|---|---|---|
| 4300037 | 4/1994 | Germany . | |
| 4296296 | 10/1992 | Japan | 285/81 |
| 2263144 | 7/1993 | United Kingdom | 286/86 |

*Primary Examiner*—Eric K. Nicholson
*Attorney, Agent, or Firm*—Finnegan, Henderson, Farabow, Garrett & Dunner

[57] ABSTRACT

A releasable plug-in connector having a tubular plug-in part with a peripheral retaining rib, a housing having a cylindrical receiving space having a central axis for receiving the plug-in part and at least one opening in a side wall of the housing communicating with said receiving space and a separate retaining ring of a hard, resilient plastic material and having radially inwardly directed, elastically sprung retaining edges for engaging behind the retaining rib of the plug-in part after the plug-in part has been inserted into the receiving space of the housing to lock the plug-in part in the housing. The retaining ring is insertable through the opening in the housing and into the receiving space so that the ring is retained against axial movement by the housing while the retaining edges are concentric with the axis of the receiving space, the retaining edges being able to be pushed apart in a radial, direction to release the plug-in part by pressing in on the ring through the opening. The improvement comprises a protective cap that can be installed over the outer side of the housing, the protective cap having a protective ring that extends around the housing and covers, at least partially, the opening in the side wall of the housing in a protective position and spring means for holding the ring in the position while permitting the ring to be pushed aside to expose the opening and permit pressing in of the retaining ring to release the plug-in part.

5 Claims, 3 Drawing Sheets

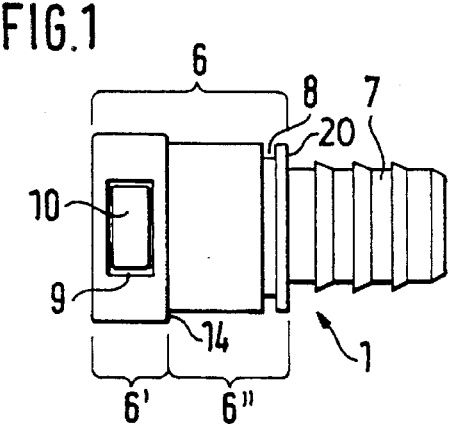
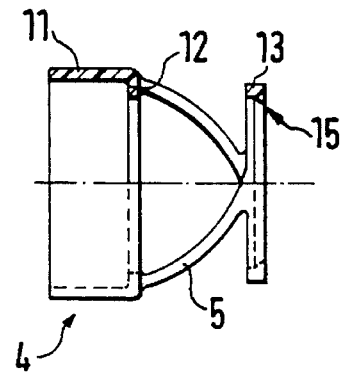
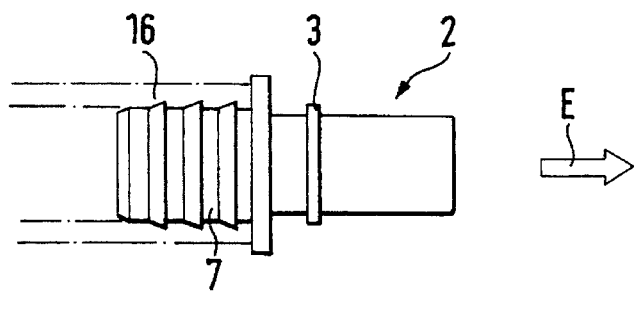
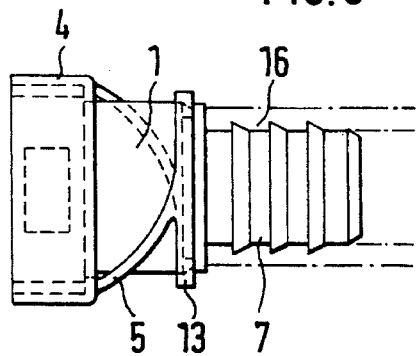
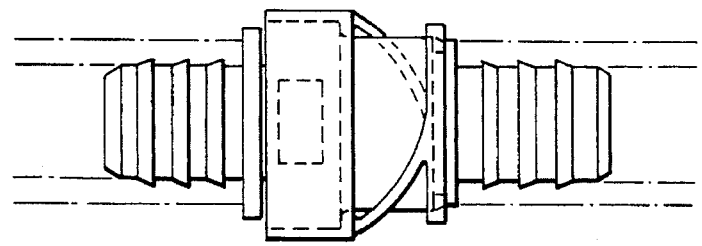
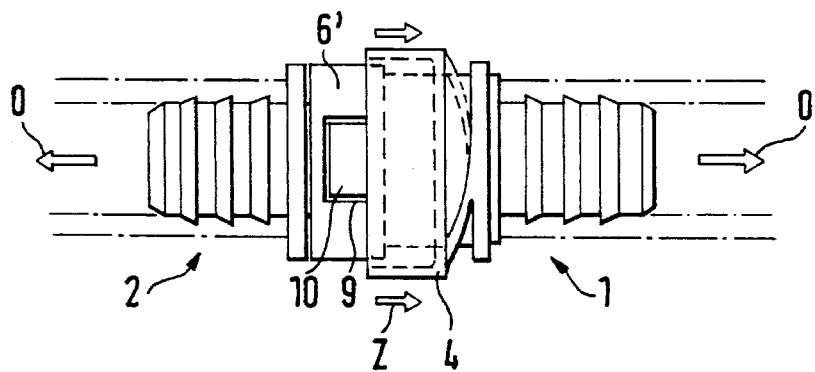

PROTECTIVE CAP FOR A RELEASABLE QUICK-ACTION CLOSURE COUPLING

BACKGROUND OF THE INVENTION

This invention relates to a protective cap for a releasable quick-action closure coupling for connecting fluid lines.

The protective cap of the present invention relates more particularly to the releasable plug-in connector of U.S. application Ser. No. 08/172,152 (now U.S. Pat. No. 5,374,088) for fuel lines, preferably in the field of motor vehicles. The connector includes a receiving housing, a plug-in part and a separate retaining ring having retaining edges that releasably lock behind a retaining rib on the plug-in part and hold it in the housing. The quick-action connector used here is subject to high safety requirements. It has to close securely and reliably when its two coupling parts are plugged together and, in addition, it must not open of its own accord in the event of unforeseen external forces acting on its retaining ring.

As far as the safety of the closure is concerned, when using the connector, the fitter principally has to rely on his senses of touch and hearing because the latch-in mechanism cannot be seen. He can feel with his fingers when, upon pressing in of the plug-in part, the retaining edges of the retaining ring latch in behind the retaining rib. In addition, the latching-in sound can usually be heard clearly. The two, however, are subjective impressions and may be overridden by vibrations or loud noise, with the result that, in the end, the fitter cannot be 100% sure that the two parts have been fitted together correctly.

An object of the present invention therefore is to provide a protective cap for the connector which prevents any unintentional effect on the retaining ring in an effective manner and, if required, simultaneously permits access to it in order to open the coupling or connector.

A further object is to configure the protective cap such that, in addition to acoustic confirmation that the retaining ring is latched in on the retaining rib, there is also visual proof of a secure closure.

SUMMARY OF THE INVENTION

This object is achieved by providing a releasable plug-in connector having a tubular plug-in part with a peripheral retaining rib, a housing having a cylindrical receiving space having a central axis for receiving the plug-in part and at least one opening in a side wall of the housing communicating with said receiving space and a separate retaining ring of a hard, resilient plastic material and having radially inwardly directed, elastically sprung retaining edges for engaging behind the retaining rib of the plug-in part after the plug-in part has been inserted into the receiving space of the housing to lock the plug-in part in the housing, said retaining ring being insertable through said opening in the housing and into said receiving space so that the ring is retained against axial movement by the housing while the retaining edges are concentric with the axis of the receiving space, said retaining edges being able to be pushed apart in a radial direction to release the plug-in part by pressing in on said ring through said opening, the improvement comprising a protective cap that can be installed over the outer side of the housing, said protective cap comprising a protective ring that extends around said housing and covers, at least partially, said opening in the side wall of the housing in a protective position and spring means for holding said ring in said position while permitting said ring to be pushed aside to expose said opening and permit pressing in of the retaining ring to release the plug-in part.

BRIEF DESCRIPTION OF THE DRAWINGS

Exemplary embodiments of the protective cap for the quick-action coupling, which are explained in more detail, are shown the drawings, in which:

FIG. 1 shows the receiving housing with an installed retaining ring;

FIG. 2 shows, in partial section, one embodiment of the protective cap of the invention;

FIG. 3 shows the receiving housing, connected to a fluid line, with the protective cap of FIG. 2 installed;

FIG. 4 shows the plug-in part having a retaining rib, also connected to a fluid line;

FIG. 5 shows the plugged-together connector with the protective cap of FIG. 2 in a closed and protective position;

FIG. 6 shows the connector with the protective cap in an open position;

DETAILED DESCRIPTION OF THE INVENTION

Figure 7:
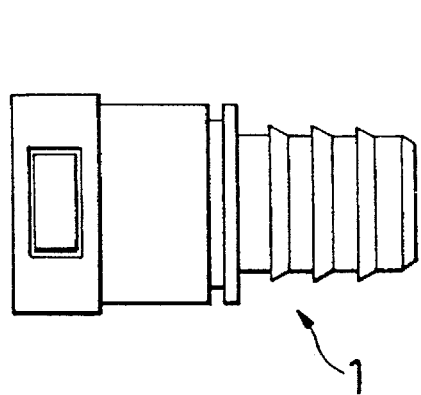
FIG. 7 shows the same receiving housing as in FIG. 1.
Figure 8:
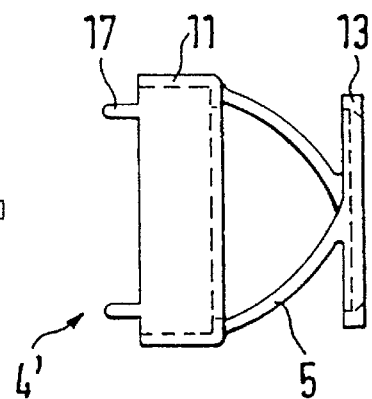
FIG. 8 shows a further embodiment of the protective cap.
Figure 10:
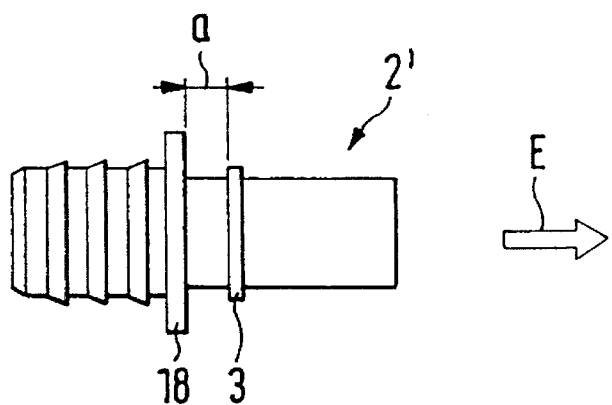
FIG. 10 shows a plug-in part, as in FIG. 4, with an additional stop flange.
Figure 9:
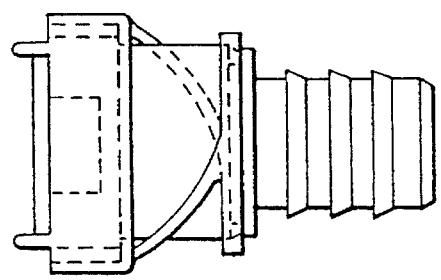
FIG. 9 shows the receiving housing with the protective cap of FIG. 8 installed.

The quick-action closure coupling or connector shown in the drawings comprises a cylindrical receiving housing 1, a tubular plug-in part 2 with a peripheral retaining rib 3, and a protective cap 4 which can be pushed on over the receiving housing 1 from the side opposite from the side plug-in part 2 is inserted into it. Cap 4 is supported against a rear end of housing 1 by means of spring elements 5 as shown in FIG. 3.

The receiving housing 1 shown in FIG. 1 has a receiving region 6 for the plug-in part 2 as well as a connection stub 7 for connection with a fluid-channeling line 16. As shown in FIG. 1, receiving region 6 is divided into a front region 6' and a rear region 6" with offset external diameters. A peripherally encircling channel 8 formed by an encircling rib 20 is located just before the rear end of region 6".

Figure 12:
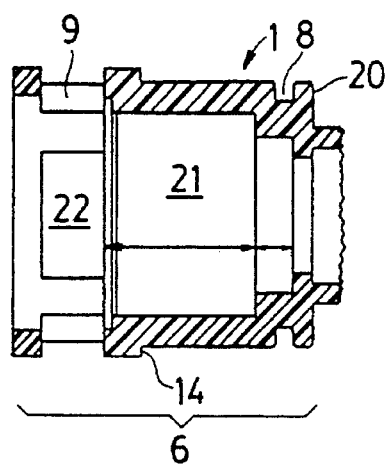
FIG. 12 shows the receiving housing of FIG. 1 in longitudinal section.
Figure 17:
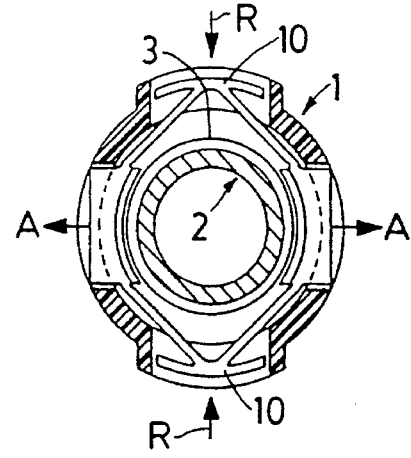
FIG. 17 is a same cross-sectional view through the receiving space, with the retaining ring in an opened position.

As described in more detail in U.S. application Ser. No. 08/172,152, the disclosure of which is incorporated herein by reference, in region 6' there is an internal receiving cavity 21 (See FIG. 12) the internal diameter of which corresponds to the external diameter of the plug-in part 2 and in region 6" a receiving space 22 (See FIG. 12) for receiving a separate retaining element or ring 23 (See FIG. 13) having radially inwardly directed, elastically sprung retaining edges 24 that engage behind the retaining rib 3 of plug-in part 2 after it has been pressed into housing 1. The retaining ring 23 is insertable into housing 1 through an opening 9 in its cylindrical outer wall and once installed to it remains in the housing. It can be compressed via diametrically opposed pressure-exerting plates 10, only one of which is shown in FIG. 1 and which are part of the retaining ring, in order to release the plug-in part 2, its retaining edges being radially spread apart as shown in FIG. 17 to such an extent that the retaining rib 3 of the plug-in part is no longer locked in the housing.

Figure 13:
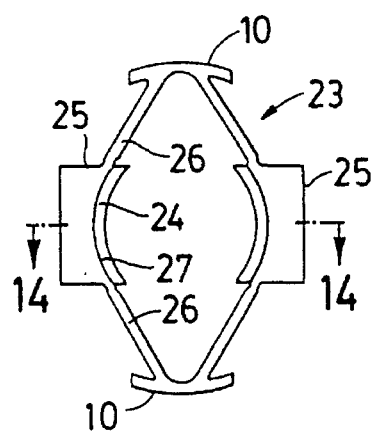
FIG. 13 is a front view of the retaining ring of the connector.
Figure 14:
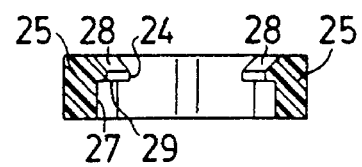
FIG. 14 is a sectional view taken along the line 14—14 in FIG. 13.

More particularly retaining ring 23 can be made, as can be best seen in FIG. 13, from two radially spaced, approximately cuboidal shaped support bodies 25 which are connected to one another at their ends via spring webs 26 that are brought together in the shape of a V, the apex of the V's being connected by pressure plates 10. The mutually facing inner walls 27 of the support bodies 25 are shaped in the form of an arc of a circle having a diameter approximately equal to the external diameter of the retaining rib 3 of the plug-in part 2 and they each carry an arcuate shaped retaining edge 24 directed radially inwards. Edges 24 have, on the plug-in side, chamfered surfaces 28 and, on the opposite side, radially offset retaining surfaces 29 that are adapted to the retaining rib 3 of the plug-in part 2 after the plug-in part has been pushed into the housing to hold or lock the part in place.

Figure 15:
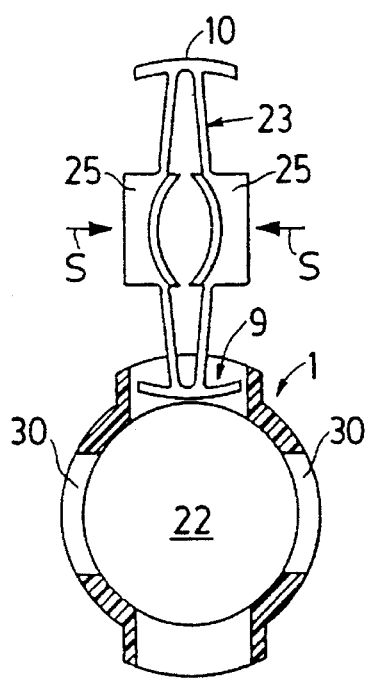
FIG. 15 shows the retaining ring as it is being introduced into an opening in the side of the housing which is shown in section.
Figure 16:
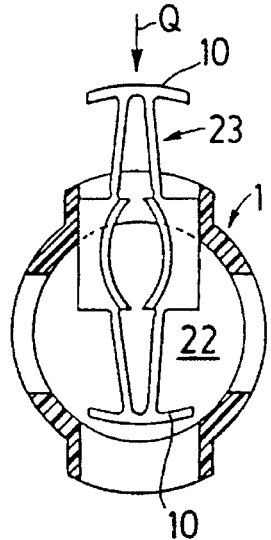
FIG. 16 shows the same retaining ring during its introduction into the receiving space of the housing.

To insert securing ring 23 into receiving space 22, support bodies 25 are first squeezed together in the direction of arrow "S", as shown in FIG. 15. With one of the pressure plates 10 leading, retaining ring 23 is then introduced in the direction of arrow "Q" into opening 9 in the wall of housing 1 and, as shown in FIG. 16, is pushed through the receiving space 22. As soon as the support bodies 25 have passed the opening 9, they move radially outwardly, owing to the restoring force of the spring webs 26, and penetrate, once they have arrived in the center of the receiving space 22, into cutouts 30 in housing 1 to such an extent that they and the ring are supported against movement in the axial direction.

Enough space remains between webs 26 and the wall of the housing for the support bodies 25 to be able to yield laterally when the plug-in part 2 is pushed in the housing. On introduction of plug-in part 2, retaining rib 3 slides over chamfered surfaces 28, pushing the retaining edges 24 outwards. As soon as rib 3 has passed edges 24, support bodies 25 will spring back again into their initial position with the trailing side of retaining rib 3 now being locked behind retaining surfaces 29. Plug-in part 2 is now locked in the plug-in connector.

When it is required to release the connector, pressure plates 10 are pressed together in the direction of arrow "R" until the retaining edges 24 have moved radially apart from one another to such an extent that the retaining edges 24 no longer engage behind the retaining rib 3 as shown in FIG. 17. Plug-in part 2 can then be drawn out of receiving housing 1 without difficulty.

The protective cap 4 shown in FIG. 2 has a cylindrical protective ring 11, with a radially inwardly directed offset stop ring 12, which ring is integrally connected, via helically designed spring webs 5, to a supporting ring 13. The internal diameter of ring 11 is dimensioned such that it can be pushed over and onto the receiving housing 1, in the direction of the arrow P', and over both the rear receiving region 6" and the front receiving region 6'. Stop ring 12 has its internal diameter dimensioned such that the latter slides over the outer surface of the rear receiving region 6" but abuts against a stop surface 14 on the rear side of front receiving region 6', which is of larger outer diameter than rear receiving region 6". In this position, supporting ring 13 of the cap first slides over rib 20 and then latches, by means of an inwardly directed latching edge 15, into the channel 8 of the receiving region 6", the webs 5 lying helically around the outer surface of the region 6" as shown in FIG. 3.

After plug-in part 2 has been pushed into the receiving housing 1 in the direction of arrow "E", retaining edges 24 of ring 23 latch in behind the retaining rib 3 of the part as described above and the coupling is closed as shown in FIG. 5. If one should wish to open it again, then first of all protective cap 4 has to be pushed back, in the direction of arrow "Z", counter to the closure force of the spring webs 5 until opening 9 is exposed. Thereafter, the mutually opposite pressure-exerting plates 10 are compressed, as a result of which the retaining ring 23 opens and releases the retaining rib 3. (FIG. 17). The two coupling halves 1 and 2 can then be pulled apart in the direction of the arrows "O". (FIG. 6).

The design of the protective cap enables it to be produced together with the supporting ring and spring webs, in one piece using a hard resilient plastic material. Further, stop ring 12 ensures,, in the protective position, a fixed abutment of the protective cap on the receiving housing.

FIGS. 7 to 11 represent a further embodiment of the protective cap, the receiving housing 1 shown in FIG. 7 being of the same construction as the receiving housing shown in FIG. 1. The protective cap 4' shown in FIG. 8 additionally includes, diametrically opposite one another on an end side of protective ring 11, a plurality of axis-parallel supporting pins or stubs 17. The plug-in part 2' according to FIG. 10 has a peripheral flange 18 integrally formed therein at a distance "a" behind its retaining rib 3, relative to its plug-in direction. The external diameter of flange 18 and the supporting pins 17 are dimensioned such that, upon closure of the connector, the protective cap 4' is pushed back somewhat. More precisely to such an extent that a part of width "b" of the pressure-exerting plates 10 of the retaining ring 23 can be seen in the opening 9. Consequently, this gives the added safety that the fitter can see that the coupling is closed. In this arrangement, it is advantageous if the retaining ring 23 and its plates 10 be of a different color than the connector housing. This facilitates visual verification.

Figure 11:
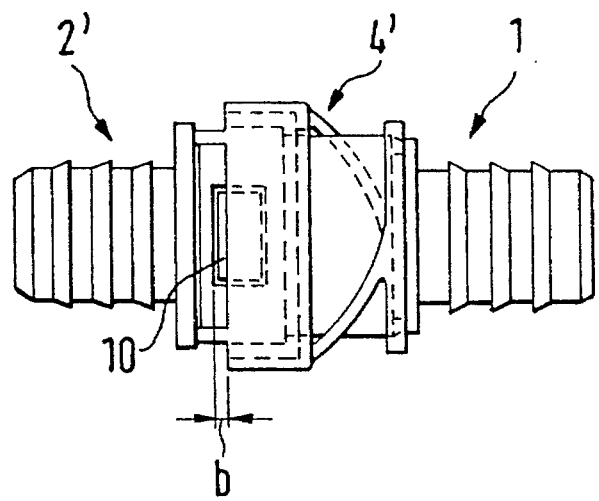
FIG. 11 shows the receiving housing connected to the plug-in part with the protective cap pushed back as evidence of the latched-in locking position.

In order to open the connector of FIG. 11, exactly the same procedure is followed as in the case of the above-mentioned embodiment according to FIG. 6, i.e. the protective cap is pushed back until the opening 9 is exposed. Thereafter, the opposite pressure-exerting plates 10 are compressed until the retaining rib 3 is released and the plug-in part 2 can be pulled out.

I claim:

1. In a releasable plug-in connector having a tubular plug-in part with a peripheral retaining rib, a housing having a cylindrical receiving space having a central axis for receiving the plug-in part and at least one opening in a side wall of the housing communicating with said receiving space and a separate retaining ring of a hard, resilient plastic material and having radially inwardly directed, elastically sprung retaining edges for engaging behind the retaining rib of the plug-in part after the plug-in part has been inserted into the receiving space of the housing to lock the plug-in part in the housing, said retaining ring being insertable through said opening in the housing and into said receiving space so that the ring is retained against axial movement by the housing while the retaining edges are concentric with the axis of the receiving space, said retaining edges being able to be pushed apart in a radial direction to release the plug-in part by pressing in on said ring through said opening, the improvement comprising a protective cap that can be installed over the outer side of the housing, said protective cap comprising a protective ring that extends around said housing and covers, at least partially, said opening in the side wall of the housing in a protective position and spring means for holding said ring in said position while permitting said ring to be pushed aside to expose said opening and permit pressing in of the retaining ring to release the plug-in part.

2. The connector of claim 1, having a cylindrical outer wall and wherein said protective cap is made of a hard, resilient plastic material and said spring means comprises a supporting ring that is axially spaced from said opening and fixed against axial movement relative to the housing when the cap is installed on the housing and a pair of helically bent spring webs partially encircling said housing and integrally connected between said protective ring and said supporting ring, said webs permitting said protective ring to be pushed axially away from said protective position and toward said supporting ring to expose said opening, while returning said protective ring to its protective position upon release thereof.

3. The connector of claim 2, wherein said supporting ring is fixed in a peripherally encircling channel on the external side of the housing.

4. The connector of claim 2, wherein the diameter of the outer wall surface of the cylindrical housing is larger adjacent the opening than between said opening and the area where the supporting ring is fixed to the housing forming a stop surface between said outer wall surfaces and the protective ring has an inwardly offset stop ring that engages against said stop surface when the protective ring of the protective cap is in said protective position.

5. The connector cap of claim 2, wherein the protective ring has on a side opposite the supporting ring at least two axis-parallel supporting pins which engage with a flange on the plug-in part as it is being inserted into the housing to push said protective ring slightly back away from its protective position and toward said supporting ring to expose a small portion of said opening when the plug-in part has been locked in the housing.

* * * * *